various modifications will be apparent from
United States Patent Office 3,159,619
Patented Dec. 1, 1964

3,159,619
PROCESS AND INTERMEDIATES FOR MANUFACTURE OF 19-HYDROXY-PREGN-4-ENE-3,20-DIONE
Raphael Pappo, Skokie, and Robert T. Nicholson, Glenview, Ill., assignors to G. D. Searle & Co., Chicago, Ill., a corporation of Delaware
No Drawing. Filed June 21, 1963, Ser. No. 289,719
11 Claims. (Cl. 260—239.55)

The present invention is concerned with a novel process utilizing novel intermediates for the manufacture of 19-hydroxypregn-4-ene-3,20-dione.

The novel intermediates of this invention are 5α-oxygenated steroids belonging to the pregnane series and can be represented by the structural formula.

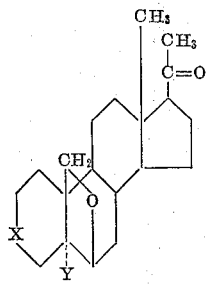

wherein X is indicative of a carbonyl, β-hydroxymethylene, or β-(lower alkanoyl)oxymethylene radical, and Y symbolizes an hydroxy, lower alkoxy, or (lower alkanoyl)oxy group.

Examples of the lower alkanoyl radicals comprehended in the foregoing structural representation are acetyl, propionyl, butyryl, valeryl, caproyl, and the corresponding branched-chain groups. The lower alkoxy groups encompassed thereby are, typically, methoxy, ethoxy, propoxy, butoxy, pentyloxy, hexyloxy, and corresponding branched-chain isomeric radicals.

The process and intermediates of this invention are useful as a result of the fact that 19-hydroxypregn-4-ene-3,20-dione is produced thereby. The latter compound can be converted by known procedures, e.g., oxidation of the hydroxymethyl to a carboxy group followed by decarboxylation, to 19-norpregn-4-ene-3,20-dione, a substance known for its potent progestational activity.

As starting materials for the conduct of the instant process the 3-(lower alkanoyl) esters of 5β,6β-epoxy-3β-hydroxypregnan-20-one may be utilized. The latter substances are allowed to react with either a lower alkanoic acid or a lower alkanol in the presence of an acid catalyst to afford the corresponding 5α-(lower alkanoyl)oxy-6β-hydroxy or 5α-(lower alkoxy)-6β-hydroxy derivatives. Oxidation of those compounds with a suitable reagent such as lead tetraacetate, lead tetraacetate and iodine, mercuric acetate and iodine, or silver acetate and iodine in a suitable inert organic solvent such as carbon tetrachloride, benzene, toluene, etc., results in the corresponding 6β,19-epoxy substances. As a specific example of the foregoing processes, 5β,6β-epoxy-3β-hydroxypregnan-20-one 3-acetate is contacted at room temperature with acetic acid in the presence of p-toluenesulfonic acid to yield 3β,5α,6β-trihydroxypregnan-20-one 3,5-diacetate, and the latter diester is heated at the reflux temperature in carbon tetrachloride with lead tetraacetate and iodine, resulting in 6β,19-epoxy-3β,5α-dihydroxypregnan-20-one 3,5-diacetate. Hydrolysis of that diester in an alkaline medium, for example an aqueous solution of potassium carbonate in methanol, yields 6β,19-epoxy-3β,5α-dihydroxypregnan-20-one. This diol is oxidized, suitably in acetone with chromic acid, to afford 6β,19-epoxy-5α-hydroxypregnane-3,20-dione. Dehydration of that 5α-hydroxy compound by heating a benzene solution with alumina at the reflux temperature results in 6β,19-epoxypregn-4-ene-3,20-dione, which is cleaved by heating in aqueous ethanol with zinc and acetic acid to produce 19-hydroxypregn-4-ene-3,20-dione. When the aforementioned 5β,6β-epoxy-3β-hydroxypregnan-20-one 3-acetate is allowed to react with a lower alkanol such as methanol in the presence of an acid catalyst such as p-toluenesulfonic acid, the resulting product is 3β-acetoxy-6β-hydroxy-5α-methoxypregnan-20-one. The aforementioned oxidation procedure utilizing lead tetraacetate and iodine yields 3β-acetoxy-6β,19-epoxy-5α-methoxypregnan-20-one. Alkaline hydrolysis of the latter ester, typically with aqueous potassium carbonate in methanol, provides 6β,19-epoxy-3β-hydroxy-5α-methoxypregnan-20-one which is oxidized, suitably by the aforementioned chromic acid procedure, to supply 6β,19-epoxy-5α-methoxypregnane-3,20-dione. Heating at the reflux temperature of a benzene solution of the latter compound with alumina results in the aforementioned 6β,19-epoxypregn-4-ene-3,20-dione, which is converted to 19-hydroxypregn-4-ene-3,20-dione as described above.

The invention is illustrated more fully by the examples which follow. These examples are set forth by way of illustration only, and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

Example 1

To a slurry of 3.75 parts of 3β-acetoxy-5β,6β-epoxypregnan-20-one in 7.9 parts of acetic acid is added 0.075 part of p-toluenesulfonic acid monohydrate at room temperature with stirring. At the end of about 5 minutes the reaction mixture becomes homogeneous, and stirring is discontinued. This reaction mixture is then allowed to stand at room temperature for about 6 hours, after which time it is diluted with benzene, then washed with water until neutral. Further washing, successively with aqueous sodium acetate, water, and saturated aqueous sodium chloride affords an organic solution which is dried over anhydrous sodium sulfate, then concentrated to dryness at reduced pressure. The resulting residue is crystallized from a mixture of acetone and hexane to yield 3β,5α-diacetoxy-6β-hydroxypregnan-20-one, melting at about 197–201°. An additional crystallization from acetone-hexane affords the pure substance, melting at about 200–202°. It is characterized further by infrared absorption maxima at about 2.74, 5.78, 5.86, and 7.98 microns and also by a nuclear magnetic resonance spectrum displaying peaks at 38, 74, 120, 123, and 127 cycles per second (10% in deuterochloroform).

Example 2

A mixture of 1.64 parts of 3β,5α-diacetoxy-6β-hydroxypregnan-20-one, 3.37 parts of lead tetraacetate, 0.97 part of iodine, and 96 parts of carbon tetrachloride is heated at the reflux temperature, in a nitrogen atmosphere, for about 7 hours, then is cooled to room temperature and filtered through a bed of diatomaceous earth. The resulting filtrate is washed successively with saturated aqueous sodium iodide, 10% aqueous sodium sulfite, water, and saturated aqueous sodium chloride, then is dried over anhydrous sodium sulfate and evaporated to dryness under reduced pressure. The resulting oil is crystallized from acetone-hexane to afford 3β,5α-diacetoxy-6β,19-epoxypregnan-20-one, melting at about 183–191°. It is recrystallized from methanol to yield a sample of the pure substance melting at 196–198°. Infrared absorption maxima are observed at 5.75, 5.85, and 7.98 microns. Nuclear magnetic resonance peaks of a 10% solution in deuterochloroform are displayed at 40, 121, 127, and 227 cycles per second. This compound is represented by the structural formula

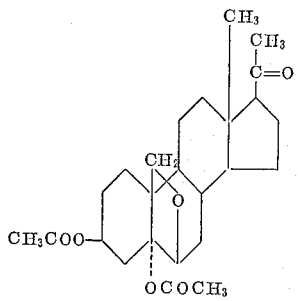

Example 3

A mixture of 8.34 parts of 3β,5α-diacetoxy-6β,19-epoxypregnan-20-one, 8.3 parts of potassium carbonate, 105 parts of methanol, and 33 parts of water is stirred at room temperature, under nitrogen, for about 20 hours. This reaction mixture is evaporated to approximately ½ volume, then is diluted with water. The oil which separates is extracted into methylene chloride, and the resulting organic solution is washed successively with water and saturated aqueous sodium chloride. Drying over anhydrous sodium sulfate followed by evaporation to dryness under reduced pressure affords a residue which is crystallized from ethyl acetate to yield 6β,19-epoxy-3β,5α-dihydroxypregnan-20-one, melting at about 232–235°. This substance displays infrared absorption maxima at about 2.80, 2.88, and 5.88 microns while a 10% solution in pyridine exhibits nuclear magnetic resonance peaks at 42 and 124 cycles per second. It is further characterized by the structural formula

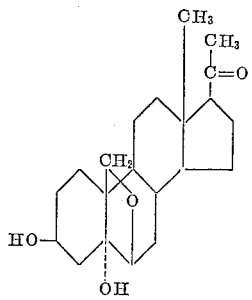

Example 4

To a solution of 2.76 parts of 6β,19-epoxy-3β,5α-dihydroxypregnan-20-one in 17.4 parts of acetone is added, at 0–5°, an aqueous solution, 8 N in chromium trioxide and 8 N in sulfuric acid, until an excess of the oxidant is present as shown by the persistence of an orange color in the supernatant liquid. After addition is complete, the excess reagent is destroyed by adding a small quantity of isopropyl alcohol, and this mixture is filtered through a bed of diatomaceous earth. Evaporation of the filtrate to dryness affords a crystalline residue which is dissolved in methylene chloride. This organic solution is then washed successively with dilute aqueous sodium hydroxide, water, and saturated aqueous sodium chloride. Drying over anhydrous sodium sulfate followed by evaporation to dryness affords a crystalline residue comprising 6β,19-epoxy-5α-hydroxypregnane-3,20-dione. Successive recrystallizations from methylene chloride-acetone and aqueous dimethylformamide afford a sample of the pure material melting at about 274–283° with decomposition. This compound displays infrared absorption maxima at about 2.90, 5.78, and 5.90 microns and is characterized also by the structural formula

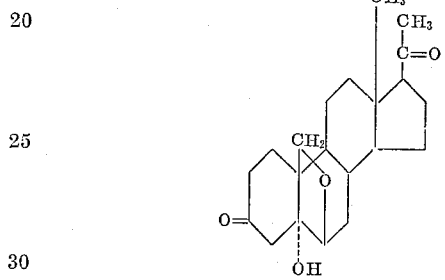

Example 5

To a solution of 1.53 parts of 6β,19-epoxy-5α-hydroxypregnane-3,20-dione in 44 parts of benzene is added 15.3 parts of Woelm basic alumina, and the resulting reaction mixture is heated at the reflux temperature, with stirring, for about 30 minutes. Removal of the alumina by filtration of the warm reaction mixture affords a clear filtrate. The filter cake is washed further with ethyl acetate, and the combined filtrate and washings are evaporated to dryness. Successive crystallizations of the residue from ether and ether-pentane results in pure 6β,19-epoxypregn-4-ene-3,20-dione, melting at about 141.5–143°. This substance is characterized by an ultraviolet absorption maximum at about 239 millimicrons with a molecular extinction coefficient of about 13,070, by infrared absorption maxima at 5.86 and 5.98 microns, and also by nuclear magnetic resonance peaks at 43 and 126 cycles per second.

Example 6

A mixture of 5.8 parts of 6β,19-epoxypregn-4-ene-3,20-dione, 11.6 parts of zinc powder, 158 parts of ethanol, 63 parts of acetic acid, and 60 parts of water is heated at the reflux temperature, under nitrogen, for about 3½ hours. Filtration through a bed of diatomaceous earth removes the zinc, and the filtrate is concentrated to a small volume under nitrogen. Dilution with water results in crystallization of the crude 19-hydroxypregn-4-ene-3,20-dione, melting at 159–165°. Recrystallization from acetone-hexane affords the pure substance melting at about 167.5–169.5°. This compound is characterized also by an ultraviolet absorption maximum at about 243 millimicrons with a molecular extinction coefficient of about 14,800 and by infrared absorption peaks at 3.00, 5.82, 5.98, and 6.18 microns.

Example 7

To a suspension of 5 parts of 3β-acetoxy-5β,6β-epoxypregnan-20-one in 16 parts of methanol, under nitrogen, is added 0.04 part of p-toluenesulfonic acid monohydrate at room temperature. This mixture is stirred for about 15 minutes, after which time an additional 0.04 part of p-toluenesulfonic acid monohydrate is added, and stirring is continued for approximately 15 minutes longer. The reaction mixture is then diluted with water and extracted with ethyl acetate. Successive washings of the ethyl acetate solution with 5% aqueous sodium bicarbonate, water, and saturated aqueous sodium chloride affords an organic solution which is dried over anhydrous sodium sulfate and concentrated to dryness under reduced pressure. The crystalline residue is recrystallized from acetone to afford pure 3β-acetoxy-6β-hydroxy-5α-methoxypregnan-20-one, melting at about 234–236°. This compound displays infrared absorption maxima at about 2.75, 3.50, 5.80, 5.86, and 7.98 microns. Nuclear magnetic resonance peaks are observed at 38, 73, 122, 127, and 194 cycles per second.

Example 8

To a solution of 4 parts of 3β-acetoxy-6β-hydroxy-5α-methoxypregnan-20-one in 240 parts of carbon tetrachloride, under nitrogen, is added successively 8.55 parts of lead tetraacetate and 2.49 parts of iodine. After heating at the reflux temperature with stirring for about 7 hours, the reaction mixture is cooled to room temperature and filtered through a bed of diatomaceous earth. The filtrate is washed successively with saturated aqueous sodium iodide, dilute aqueous sodium sulfite, water, and saturated aqueous sodium chloride, then is dried over anhydrous sodium sulfate and evaporated to dryness under reduced pressure. The resulting oil is crystallized from aqeuous acetone to yield 3β-acetoxy-6β,19-epoxy-5α-methoxy-pregnan-20-one, melting at about 113–114°. It is characterized also by the structural formula

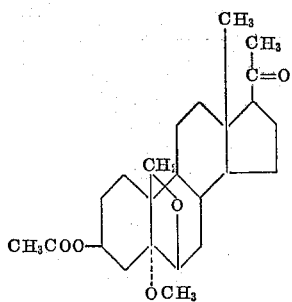

Example 9

To a solution of 1.69 parts of 3β-acetoxy-6β,19-epoxy-5α-methoxypregnan-20-one in 21.3 parts of methanol is added successively 6.8 parts of water and 1.69 parts of potassium carbonate. This reaction mixture is stirred at room temperature for about 18 hours in a nitrogen atmosphere. Dilution with water results in separation of an oil which is extracted into methylene chloride. This organic solution is washed with water, dried over anhydrous sodium sulfate and concentrated to dryness under reduced pressure to afford 6β,19-epoxy-3β-hydroxy-5α-methoxypregnan-20-one, characterized by the structural formula

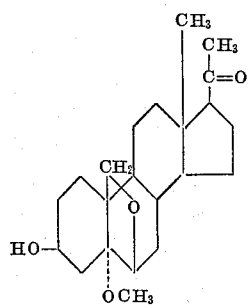

Example 10

To a solution of 1.367 parts of 6β,19-epoxy-3β-hydroxy-5α-methoxypregnan-20-one in 79 parts of acetone is added dropwise, at 0–5°, an aqueous solution, 8 N in chromium trioxide and 8 N in sulfuric acid. The addition is continued until an orange color persists, at which time sufficient isopropyl alcohol is added to destroy the excess reagent. This mixture is then diluted with water and extracted with methylene chloride. The methylene chloride layer is separated, washed successively with dilute aqueous sodium hydroxide, water, and saturated aqueous sodium chloride. Drying over anhydrous sodium sulfate followed by evaporation to dryness under reduced pressure results in 6β,19-epoxy-5α-methoxypregnane-3,20-dione. This substance is represented by the structural formula

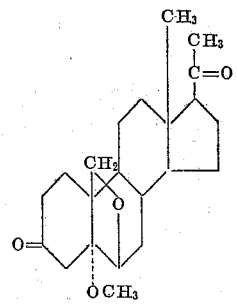

Example 11

A mixture of 1.2 parts of 6β,19-epoxy-5α-methoxypregnane-3,20-dione, 12 parts of Woelm basic alumina, and 35.2 parts of benzene is heated with stirring at the reflux temperature for about 30 minutes. The alumina is removed by filtration of the warm reaction mixture, and the filter cake is washed with a mixture of ethyl acetate and benzene. Concentration to dryness of the combined filtrate and washings results in 6β,19-epoxypregn-4-ene-3,20-dione, identical with the product of Example 5.

Example 12

The substitution of 3.89 parts of 5β,6β-epoxy-3β-propionoxypregnan-20-one in the procedure of Example 1 results in 5α-acetoxy-6β-hydroxy-3β-propionoxypregnan-20-one.

Example 13

By substituting 1.69 parts of 5α-acetoxy-6β-hydroxy-3β-propionoxypregnan-20-one and otherwise proceeding according to the processes of Example 2, 5α-acetoxy-6β,19-epoxy-3β-propionoxypregnan-20-one is obtained.

Example 14

By substituting 8.61 parts of 5α-acetoxy-6β,19-epoxy-3β-propionoxypregnan-20-one and otherwise proceeding according to the processes of Example 3, 6β,19-epoxy-3β,5α-dihydroxypregnan-20-one, identical with the product of that example, is obtained.

Example 15

The substitution of 5.19 parts of 5β,6β-epoxy-3β-propionoxypregnan-20-one in the processes described in Example 7 results in 6β-hydroxy-5α-methoxy-3β-propionoxypregnan-20-one.

Example 16

By substituting 4.14 parts of 6β-hydroxy-5α-methoxy-3β-propionoxypregnan-20-one and otherwise proceeding according to the procedure of Example 8, 6β,19-epoxy-5α-methoxy-3β-propionoxypregnan-20-one is obtained.

Example 17

The substitution of 1.75 parts of 6β,19-epoxy-5α-methoxy-3β-propionoxypregnan-20-one in the procedure of Example 9 results in 6β,19-epoxy-3β-hydroxy-5α-methoxypregnan-20-one, identical with the product of that example.

What is claimed is:

1. A process for the manufacture of 19-hydroxypregn-4-ene-3,20-dione which comprises the steps of reacting a 3β - (lower alkanoyl)oxy - 5β,6β - epoxypregnan - 20-one with acetic acid in the presence of an acid catalyst, converting the resulting 5α-acetoxy-3β-(lower alkanoyl)-oxy - 6β - hydroxypregnan - 20 - one to a 5α - acetoxy-3β - (lower alkanoyl)oxy - 6β,19 - epoxypregnan - 20-one by reaction with lead tetraacetate, hydrolyzing the latter substance with an inorganic alkali, oxidizing the resulting 6β,19 - epoxy - 3β,5α - dihydroxypregnan - 20-one with chromic acid, dehydrating the resulting 6β,19-epoxy-5α-hydroxypregnane-3,20-dione with alumina, and contacting the resulting 6β,19 - epoxypregn - 4 - ene-3,20-dione with zinc and acetic acid to afford 19-hydroxypregn-4-ene-3,20-dione.

2. The process of claim 1, wherein the 3β-(lower alkanoyl)oxy-5β,6β-epoxypregnan-20-one is 3β-acetoxy-5β,6β-epoxypregnan-20-one.

3. A process for the manfacture of 19-hydroxypregn-4-ene-3,20-dione which comprises the steps of reacting a 3β - (lower alkanoyl)oxy - 5β,6β - epoxypregnan - 20-one with methanol in the presence of an acid catalyst, converting the resulting 3β - (lower alkanoyl)oxy - 6β-hydroxy - 5α - methoxypregnan - 20 - one to a 3β-(lower alkanoyl)oxy - 6β,19 - epoxy - 5α - methoxypregnan-20-one by reaction with lead tetraacetate, hydrolyzing the later substance with an inorganic alkali, oxidizing the resulting 6β,19-epoxy-3β-hydroxy-5α-methoxypregnan-20-one with chromic acid to afford 6β,19-epoxy-5α-methoxypregnane-3,20-dione, contacting the latter substance with alumina, and cleaving the resulting 6β,19-epoxypregn-4-ene-3,20-dione with zinc and acetic acid to yield 19-hydroxypregn-4-ene-3,20-dione.

4. The process of claim 3, wherein the 3β-(lower alkanoyl)oxy - 5β,6β - epoxypregnan - 20 - one is 3β-acetoxy-5β,6β-epoxypregnan-20-one.

5. A compound of the formula

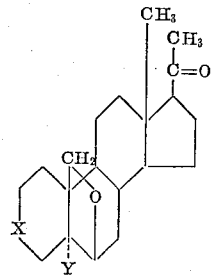

wherein X is selected from the group of radicals consisting of carbonyl, β-hydroxymethylene, and β-(lower alkanoyl)-oxymethylene, and Y is a member of the class of radicals consisting of hydroxy, methoxy, and acetoxy.

6. 6β,19 - epoxy - 3β,5α - dihydroxypregnan - 20 - one 3,5-diacetate.

7. 6β,19-epoxy-3β,5α-dihydroxypregnan-20-one.

8. 6β,19-epoxy-5α-hydroxypregnane-3,20-dione.

9. 3β - acetoxy - 6β,19 - epoxy - 5α - methoxypregnan-20-one.

10. 6β,19 - epoxy - 3β - hydroxy - 5α - methoxypregnan-20-one.

11. 6β,19-epoxy-5α-methoxypregnane-3,20-dione.

References Cited in the file of this patent
UNITED STATES PATENTS 3,008,957    Ringold et al. _____ Nov. 14, 1961
3,080,381    Pappo _____ Mar. 5, 1963

OTHER REFERENCES

Berkoz et al.: "Steroids," vol. 1, No. 3, March 1963, pp. 251–270.